US010849275B2

(12) United States Patent
Estes (10) Patent No.: US 10,849,275 B2
(45) Date of Patent: Dec. 1, 2020

(54) CONCAVE THRESHING BARS FOR USE IN AN AGRICULTURAL HARVESTER (71) Applicant: CSM Corp., Peoria, IL (US)

(72) Inventor: Donald J. Estes, Frankfort, IN (US)

(73) Assignee: CSM Corp., Peoria, IL (US)

( * ) Notice: Subject to any disclaimer, the term of this patent is extended or adjusted under 35 U.S.C. 154(b) by 344 days.

(21) Appl. No.: 15/926,294

(22) Filed: Mar. 20, 2018

(65) Prior Publication Data
US 2018/0359926 A1 Dec. 20, 2018

Related U.S. Application Data (60) Provisional application No. 62/520,188, filed on Jun. 15, 2017.

(51) Int. Cl.
A01F 12/24 (2006.01)
A01F 11/06 (2006.01)
A01F 7/06 (2006.01)

(52) U.S. Cl.
CPC ............... A01F 12/24 (2013.01); A01F 7/06 (2013.01); A01F 7/067 (2013.01); A01F 11/06 (2013.01)

(58) Field of Classification Search
USPC ........................................................ 460/110
See application file for complete search history.

(56) References Cited

U.S. PATENT DOCUMENTS

| 6,193,604 | B1 | | 2/2001 | Ramp et al. | |
|---|---|---|---|---|---|
| 6,327,970 | B1 | * | 12/2001 | Kooima | A01D 43/081 460/108 |
| 7,207,882 | B2 | * | 4/2007 | Schmidt | A01F 12/52 460/46 |
| 7,285,043 | B2 | * | 10/2007 | Foster | A01F 12/24 460/110 |
| 8,454,416 | B1 | * | 6/2013 | Estes | A01F 12/24 460/107 |
| 8,690,652 | B1 | * | 4/2014 | Estes | A01F 12/24 460/107 |
| 9,775,296 | B2 | * | 10/2017 | Haus | C23C 4/10 |
| 10,609,867 | B1 | * | 4/2020 | Kile | A01F 12/26 |
| 2015/0017394 | A1 | * | 1/2015 | Johnson | B65G 33/265 428/192 |

* cited by examiner

Primary Examiner — Thomas B Will
Assistant Examiner — Mai T Nguyen
(74) Attorney, Agent, or Firm — Taylor IP, P.C.

(57) ABSTRACT

A concave includes a frame and an array of threshing elements supported by the frame, the threshing elements being spaced apart and extending generally parallel to one another. The threshing elements each have formed on an upper portion thereof disposed adjacent to an upper portion of the frame a longitudinally-extending notch respectively defining an aggressive threshing edge. The threshing edges faces a direction opposite to the direction of rotation of a harvester rotor. The notch is recessed into the bar and disposed adjacent to the upper portions of the opposite members of the frame and facing opposite to a direction of movement of the rotor. The notch has a channel along an outer edge of the notch, the channel being filled with filler material having a differing hardness than a hardness of the bar.

20 Claims, 9 Drawing Sheets

CONCAVE THRESHING BARS FOR USE IN AN AGRICULTURAL HARVESTER

CROSS REFERENCE TO RELATED APPLICATIONS

This is a non-provisional application based upon U.S. provisional patent application Ser. No. 62/520,188, entitled "CONCAVE THRESHING BARS FOR USE IN AN AGRICULTURAL HARVESTER", filed Jun. 15, 2017, which is incorporated herein by reference.

BACKGROUND OF THE INVENTION

1. Field of the Invention

The present invention generally relates to a concave for an agricultural combine and, more particularly, is concerned with a concave with an array of longitudinally notched spaced apart threshing elements that reduce concave plugging and enable more effective threshing.

2. Description of the Prior Art

Rotary combines have a rotary crop processing unit that threshes and separates the grain from the harvested crop material. The rotary crop processing unit is formed by a rotor radially surrounded by a casing. The rotor and casing together define an inlet section, a threshing section and a separating section. As disclosed in U.S. Pat. No. 6,193,604 to Ramp et al., the bottom of the casing has a concave under the threshing section for threshing the crop material and a separating grate under the separator section for separating the grain from the threshed crop material. The inlet section pulls the harvested crop material from a front crop gathering unit into the threshing section. The threshing section threshes the crop material and then feeds the threshed crop material to the separator section.

As shown in the Ramp et al. patent, the concave is provided with a combination of threshing elements in the form of straight bars square in cross-section that are spaced apart from one another with wires between the bars. The objective of this combination is to restrict the flow of crop material so as to enhance threshing of the crop material in the threshing section. However, under corn crop conditions, a tendency frequently develops for crop material flow to be restricted too much by corn shucks getting hung up on the bars and catching on the wires, resulting in plugging of the concave. One solution tried thus far has been to change the threshing elements of the concave to round bars with no wires. But now a tendency frequently develops under some crop conditions, other than corn, for too little restriction of crop material flow such that the other crop materials are not threshed effectively, resulting in overloading of the separator section.

Consequently, a need remains for innovation that will provide a solution to the aforementioned problems.

SUMMARY OF THE INVENTION

The present invention provides a concave designed to overcome the above-described drawbacks and satisfy the aforementioned need. The concave of the present invention incorporates an array of spaced apart threshing elements that have longitudinal notches formed on their upper portions respectively defining aggressive threshing edges, with one of the edges having an irregular undulating surface. The round configuration of the spaced apart bars reduces plugging of the concave as the threshing edges of the longitudinal notches, facing in a direction opposite to the direction of crop material flow, restrict crop material flow and thereby enable more effective threshing.

Accordingly, the present invention is directed to a concave which includes a frame and an array of threshing elements supported by the frame, the threshing elements being spaced apart and extending generally parallel to one another. The threshing elements each have formed on an upper portion thereof disposed adjacent to an upper portion of the frame a longitudinally-extending notch respectively defining an aggressive threshing edge. The threshing edges faces a direction opposite to the direction of rotation of a harvester rotor. The notch is recessed into the bar and disposed adjacent to the upper portions of the opposite members of the frame and facing opposite to a direction of movement of the rotor. The notch has a channel along an outer edge of the notch, the channel being filled with filler material having a differing hardness than a hardness of the bar.

More particularly, each bar has an upper portion and a lower portion underlying the upper portion such that the upper portion extends upwardly from the lower portion with the notch adjacent to the upper portion and above the lower portion of the bar and extending longitudinally between opposite ends of the bar. The notch of each bar is defined by a first surface on the lower portion of the bar and a second surface on the upper portion of the bar extending upright from and in transverse relation to the first surface. The notch has a channel along an outer edge of the notch, the channel being filled with filler material having a differing hardness than a hardness of the bar.

The frame includes a pair of opposite side members and a pair of end members spaced apart from and extending generally parallel to one another and having ends joined to corresponding ends of the opposite side members. The frame further includes at least one intermediate member spaced between and extending generally parallel the opposite end members and extending between and joined to the opposite side members. The opposite end members and intermediate member have top edges and openings formed in the opposite end members and the intermediate member adjacent to and below the top edges. The openings are spaced apart from one another such that the bars extend past the intermediate member and between the opposite end members with the opposite ends of the bars seated in the openings of the opposite end members and the intermediate member. Further, the opposite end members and the intermediate member together are curved in configuration such that their top edges lie along a common surface curved in configuration. The bars each have a notch with a channel along an outer edge of the notch, the channel being filled with filler material having a differing hardness than a hardness of the bar.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 8:
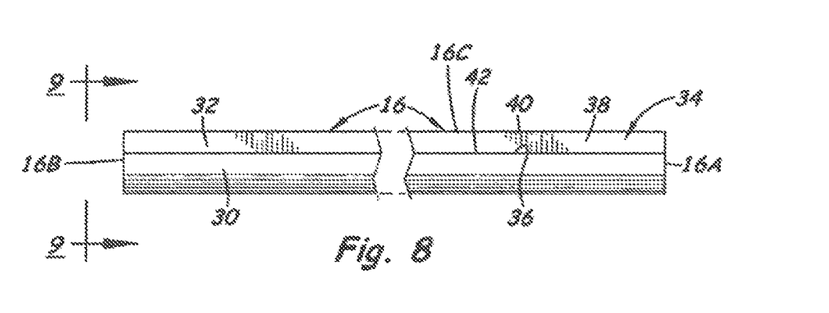
FIG. 8 is an enlarged foreshortened front elevational view of one of the threshing elements of the concave.
Figure 9:
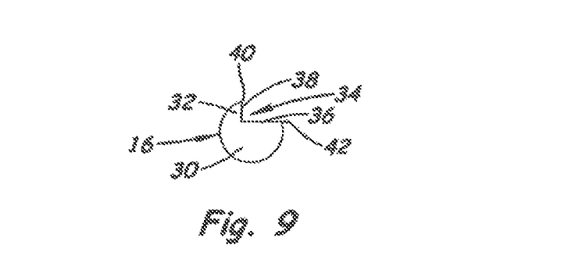
FIG. 9 is an end elevational view of the one threshing element as seen along line 9-9 in FIG. 8.

Referring to the drawings, and particularly to FIGS. 1-4, there is illustrated an exemplary embodiment of a threshing concave, generally designated 10, having a construction in accordance with the present invention. The concave 10 includes a frame 12 and an array 14 of elongated threshing elements 16 supported by the frame 12. Each of the threshing elements 16, as best seen in FIGS. 8 and 9, has a cross-sectional configuration in accordance with the present invention. The components of the concave 10 are made of a suitable substantially rigid material, such as steel.

Figures 5, 6:
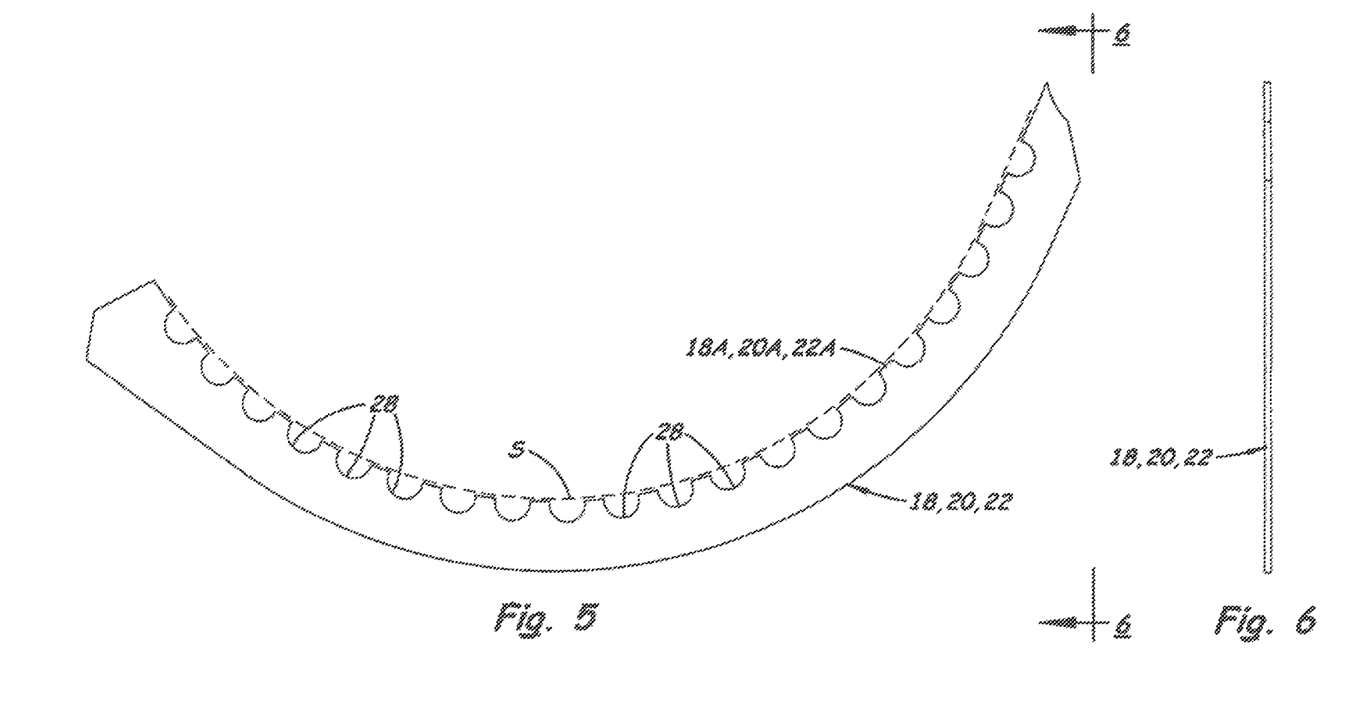
FIG. 5 is an enlarged end elevational view of a representative one of a pair of opposite end frame members and an intermediate frame member of the concave of FIGS. 1-3 showing one configuration of openings formed in the frame members for seating the array of threshing elements as shown in FIG. 7.
FIG. 6 is a side elevational view of the one end member of the concave as seen along line 6-6 in FIG. 5.

More particularly, referring now to FIGS. 1-12, the frame 12 is formed by opposite end members 18, 20, an intermediate member 22 and opposite side members 24, 26. The opposite end members 18, 20, being of substantially identical configuration, are spaced apart from one another and extend generally parallel to one another. The end members 18, 20 and intermediate member 22, as seen particularly in FIGS. 5 and 6, are in the form of relatively thin elongated plates. The intermediate member 22 is spaced substantially equidistantly between the end members 18, 20 and extends generally parallel thereto. The end and intermediate members 18, 20, 22 together are similarly curved in configuration and have respective inner top edges 18A, 20A, 22A which lie along a common surface S of curved shape that is spaced from and extend circumferentially about a portion of a rotor 102 of a crop material harvesting machine 100, the rotary combine, when the concave 10 is installed in the combine. The end and intermediate members 18, 20, 22 each has a plurality of openings, more particularly, in configurations of slots or recesses 28, spaced apart from one another and formed in the upper portions of each of the end and intermediate members 18, 20, 22, below and open at their inner top edges 18A, 20A, 22A, such that the spaced apart openings formed in one opposite end member 18 respectively correspond with the spaced apart openings formed in the other opposite end member 20 and the intermediate member 22.

The side members 24, 26 of the frame 12 are spaced from one another and extend generally parallel to one another. The side members 24, 26 also extend transversely between and are rigidly joined to corresponding ends of the curved end and intermediate members 18, 20, 22. The side members 24, 26 are straight in configuration for supporting the frame 12 as part of the casing (not shown) below the rotor (not shown) of the combine.

Figure 7:
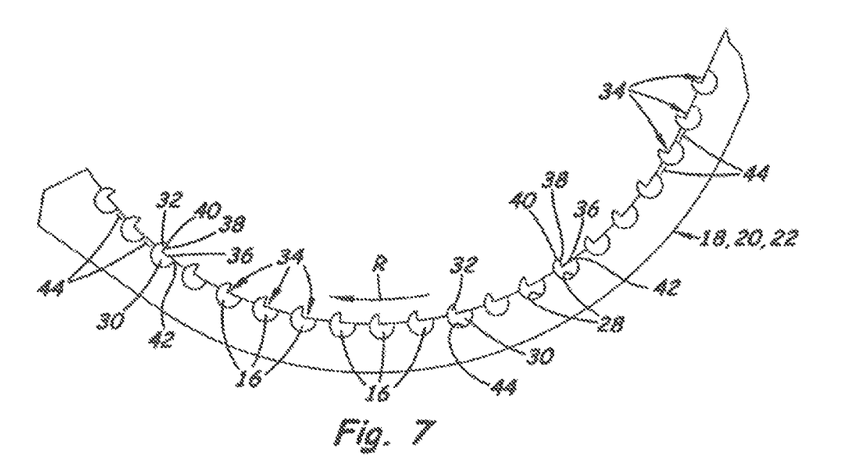
FIG. 7 is an end elevational view of the one end member of the concave as shown in FIG. 5 now also showing the ends of the arrayed threshing elements seatably mounted to the one end member.

Referring now to FIGS. 7-9, the array 14 of elongated threshing elements 16 supported by the frame 12 take the form of a plurality of elongated longitudinally-notched spaced-apart bars 16 supported by the frame 12. The bars 16 are straight in longitudinal extent and round in cross-section, and extend between the opposite end members 18, 20 past the intermediate member 22 of the frame 12. The bars 16 are spaced apart from and extend generally parallel to one another. At their opposite end portions 16A, 16B and an intermediate portion 16C, the bars 16 are seated in the shape-conforming concave slots or recesses 28 formed in the end and intermediate members 18, 20, 22 of the frame 12. Further, the bars 16, at their opposite ends 16A, 16B and intermediate portion 16C, are affixed, using any suitable technique, such as by welding, to the end and intermediate members 18, 20, 22 of the frame 12.

Figure 1:
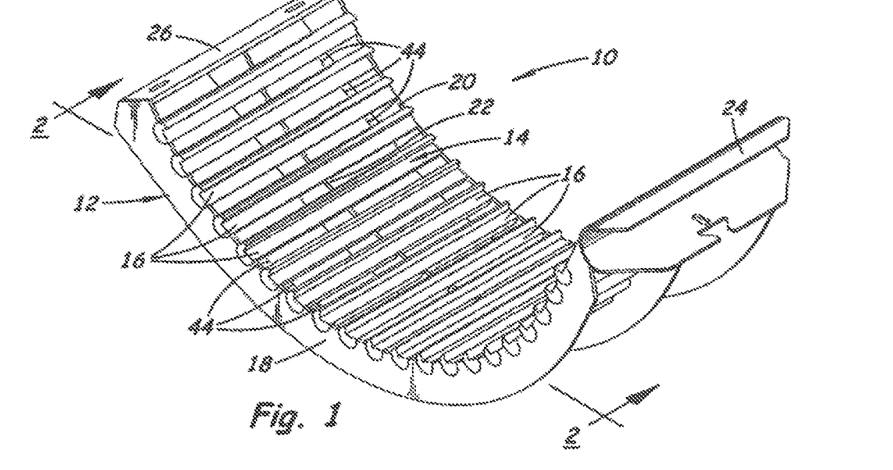
FIG. 1 is a perspective view of an exemplary embodiment of a threshing concave in accordance with the present invention incorporating an array of longitudinally notched spaced apart threshing elements.
Figure 2:
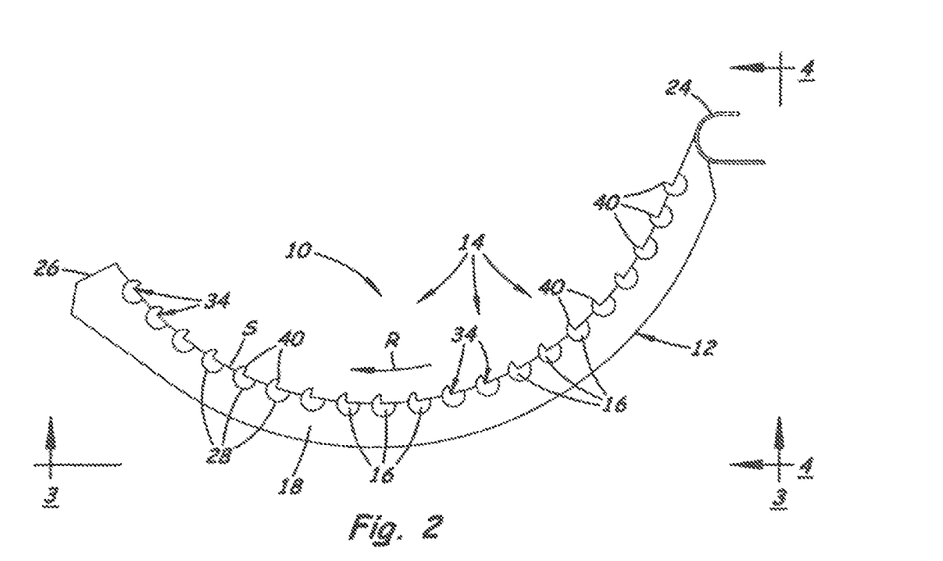
FIG. 2 is an end elevational view of the concave as seen along line 2-2 in FIG. 1.
Figure 3:
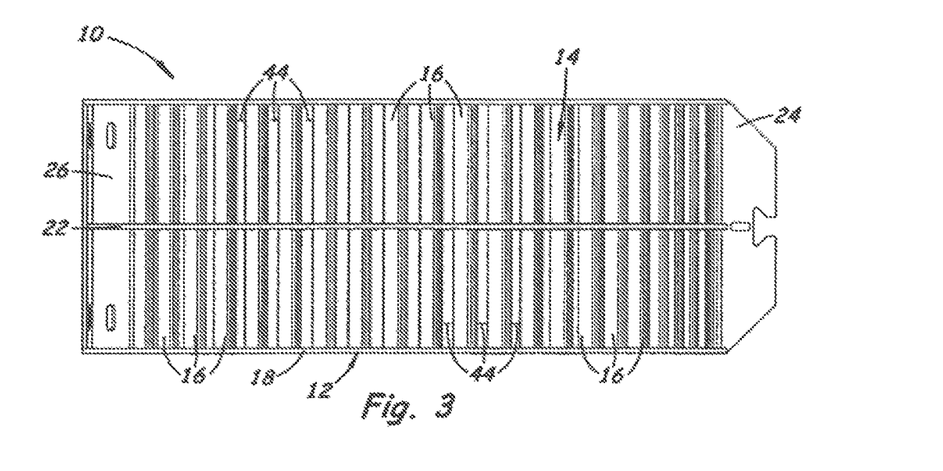
FIG. 3 is a bottom plan view of the concave as seen along line 3-3 in FIG. 2.
Figure 4:
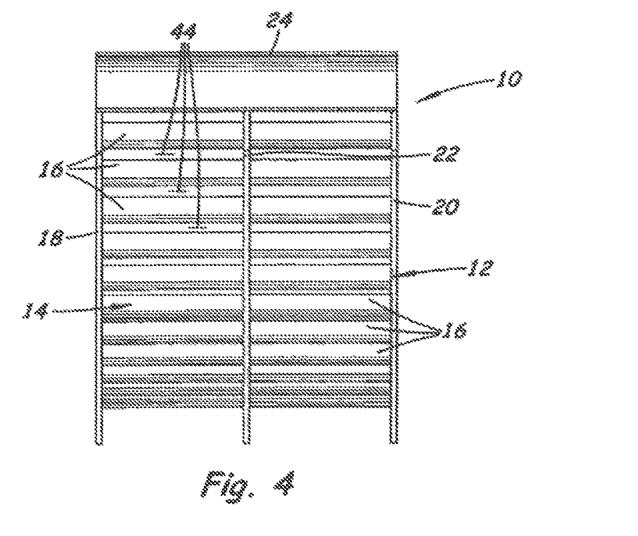
FIG. 4 is a side elevational view of the concave as seen along line 4-4 in FIG. 2.

More particularly, each elongated bar 16 has a lower portion 30, an upper portion 32 and a longitudinally-extending notch 34. (The notches 34 are also shown in FIG. 1, 2.) The lower portion 30 of each bar 16 has about a semi- or half-cylindrical rounded configuration in cross-section. The lower portion 30 is seated in the shape-conforming concave slots or recesses 28 spaced apart from one another and formed in the frame end and intermediate members 18, 20, 22 below and open at their inner top edges 18A, 20A, 22A. The upper portion 32 of each bar 16 has about a quarter-cylindrical rounded configuration in cross-section. The upper portion 32 merges from the lower portion 30 and extends above the lower portion 30 and the inner top edges 18A, 20A, 22A of the end and intermediate members 18, 20, 22 of the frame 12. Thus, the depths of the recesses 28 into frame members 18, 20, 22 are such that the notches 34 of the bars 16 seated in the recesses 28 are disposed substantially above the top edges 18A, 20A, 22A of the frame members 18, 20, 22.

The longitudinally-extending notch 34 in the bar 16 is defined by first and second surfaces 36, 38 formed on the bar 16 and disposed in a transverse relation to one another, for example through an angle of about 90 degrees. The first surface 36 lies on the lower portion 30 of the bar 16, extending longitudinally along the bar 16 between the opposite end portions 16A, 16B of the bar, forwardly of the upper portion 32 and above the lower portion 30 of the bar 16. The first surface 36 on the lower portion 30 of the bar 16 is generally coextensive with the common surface S of curved configuration in which lie the inner top edges 18A, 20A, 22A of the end and intermediate members 18, 20, 22 of the frame 12. The second surface 38 lies on the upper portion 32 of the bar 16, extending upright from and in the transverse relation to the first surface 36, above the inner top edges 18A, 20A, 22A of the end and intermediate members 18, 20, 22 of the frame 12 and toward the rotor of the crop material harvesting machine. The second surface 38 faces in a direction opposite to the direction of rotation R of the rotor relative to the frame 12 such that second surface 38 defines an exposed forward-facing relatively aggressive threshing edge 40 on the bar 16 for restricting the flow of crop material over and past the bar 16 while the first surface 36 defines an exposed upward-facing edge 42 on the bar 16 for restricting the flow of crop material outwardly through the spaces 44 between the bars 16. Although not shown in FIGS. 2, 5 and 7 in order to simplify illustration of the concave 10, the space 44 between the recesses 28 and thus between the seated bars 16 preferably progressively increase in width or are more open going from one of the side members 24 of the frame 12 to the other side member 26 in the direction of rotation R of the rotor relative to the frame 12 to aid in removing crop material sooner to avoid overloading the following separator section of the casing.

By way of example, not as a limitation, the widths of the spaces 44 may increase from the smallest of about 0.875 inch to the largest of about 1.25 inches. The length of the bars 16 may be about 13.75+/−0.03 inches. The diameter of the bars 16 may be about 1 inch. The width of the first surface 36 may be about 0.625 inch. The width of the second surface 38 may be about 0.375 inch. The radius of the recesses 28 may be slightly greater than 0.5 inch in order to accommodate the bars 16 each having the 0.5 inch radius.

Figures 10, 11:
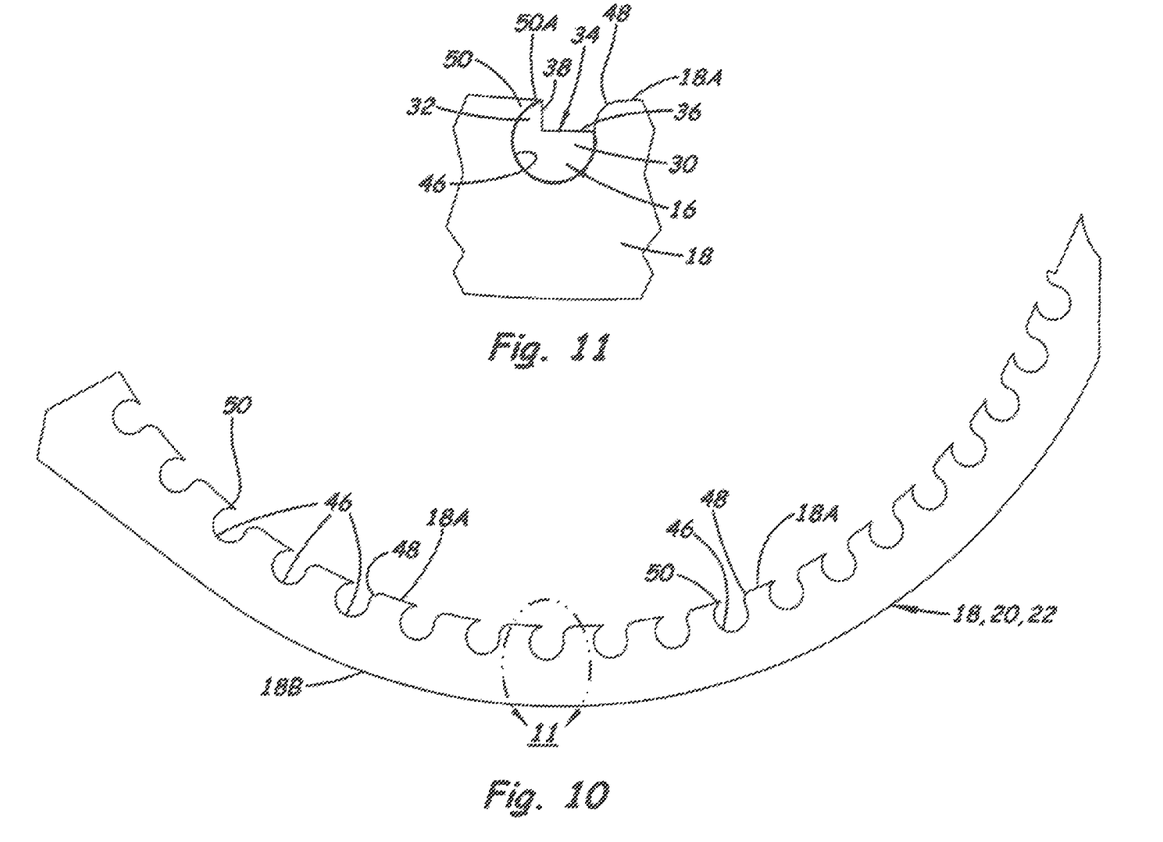
FIG. 10 is an enlarged end elevational view of the same frame member as that shown in FIG. 5 but now having openings of a modified configuration formed in the frame member in place of configurations of the openings shown in FIG. 5.
FIG. 11 is an enlarged view of a fragmentary portion of the frame member enclosed by the dashed circle 11 in FIG. 10 now also showing an end view of a threshing element seated in a respective one of the openings of the modified configuration formed in the frame member.
Figure 12:
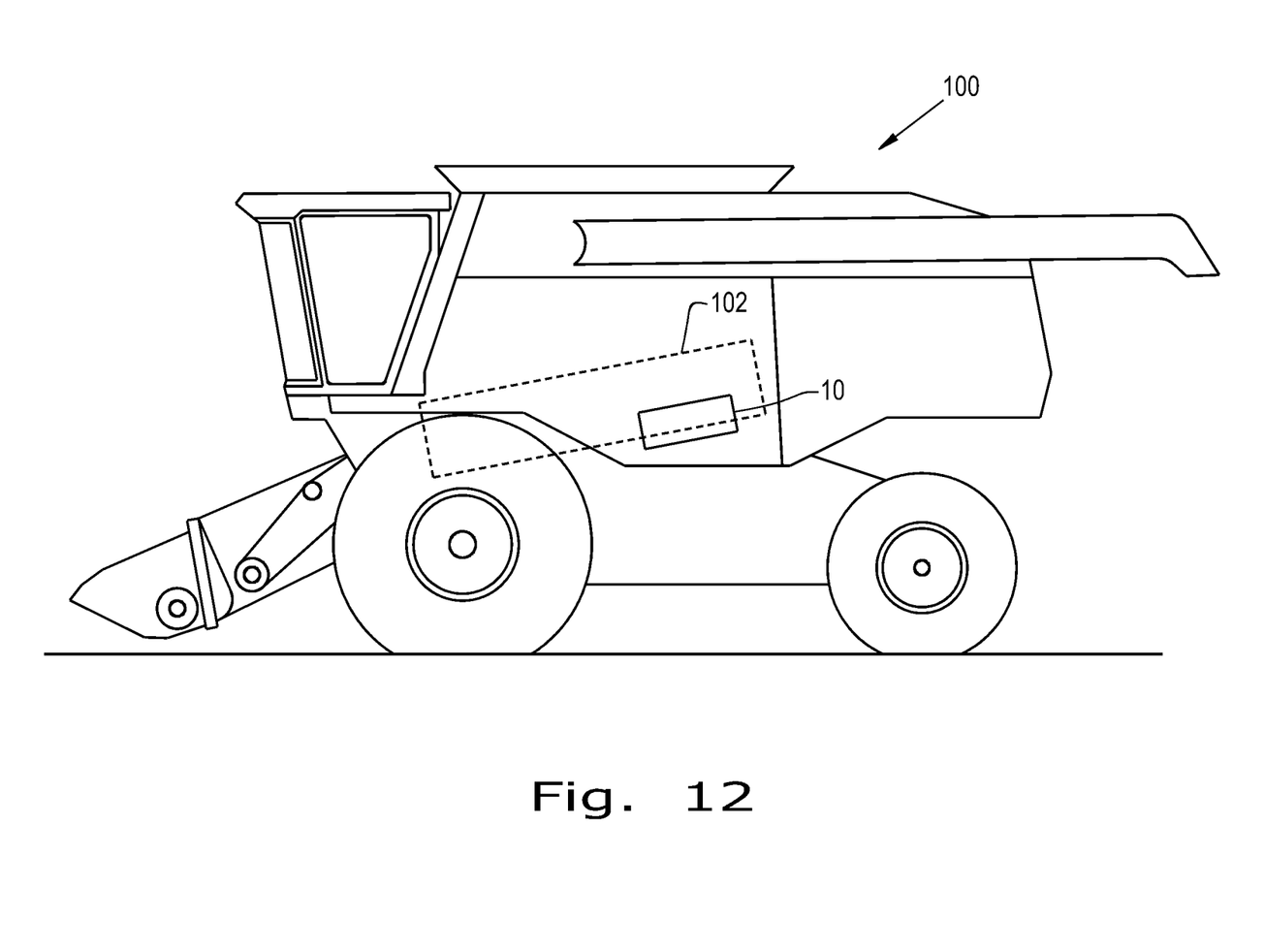
FIG. 12 illustrates a combine having a rotor and using the concave shown in the foregoing drawings.
Figure 13:
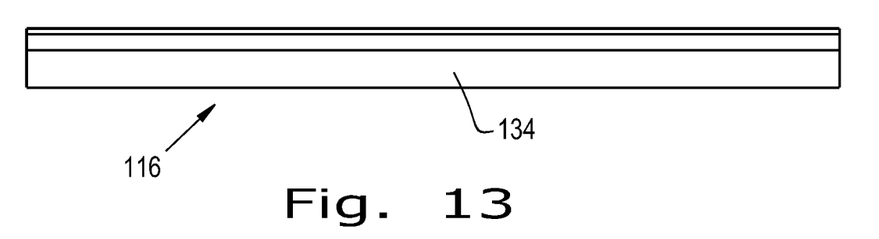
FIG. 13 illustrates a new embodiment of a threshing bar for use in the concave of FIGS. 1-7, 10 and 11.

Referring now to FIGS. 10 and 11, there is shown the same representative one frame member 18, of the frame members 18, 20, 22, as that shown in FIG. 5. Now the frame member 18 (and likewise in the case of the other frame members 20, 22) has a plurality of openings formed therein, more particularly, with modified configurations in the form of substantially circular shaped holes 46 in place of the semi-circular shaped recesses 28 shown in FIG. 5. The holes 46, having the same radius as the recesses 28, are displaced, by way of example, approximately three-eighths inch closer to the bottom edge 18B of the frame member 18 than were the recesses 28. Further, the upper portions of the frame member 18 at the right sides of the holes 46 have rounded configurations that merge with the top edge 18A so as to provide the frame member 18 with rounded edge segments 48 that extend between the holes 46 and the top edge 18A and that are opposite from pointed edge segments 50 on the upper portions of the frame member 18A on the left side of the holes 46 which pointed edge segments 50 backstop the portions of the rods 16 seated in the holes 46, as shown in the case of the representative one rod 16 in FIG. 11. The second surface 38 of the notch 34 on the upper portion 32 of the bar 16 is generally aligned vertically with the tip 50A of the pointed edge segment 50. As also shown in FIG. 10, the center-to-center distances between the holes 46, and thus the widths of the spaces between the rods 16 seated therein, preferably progressively increase going from right to left as seen in FIG. 10. By way of example, not as a limitation, the center-to-center distances may increase from the smallest of about 1.75 inch to the largest of about 2.34 inches. There are nineteen holes 46 and thus the same number of seated bars 16 in the frame member 18 shown in FIG. 10 versus twenty recesses 38 and thus the same number of seated bars 16 in the frame member 18 shown in FIG. 5. Because of the greater depth of the holes 46 from the top edge 18A into the frame member 18 (and likewise in the case of the other frame members 20, 22), the notches 34 of the bars 16 seated in holes 46 are disposed substantially below the top edge 18a of the frame member 18.

Now, additionally referring to FIGS. 13-16 there is show a new and other embodiment of a bar 116, having some similar features of bar 16, but with 100 added to the reference numbers to indicate the new embodiment, but with the basic description of the referenced items being the same. Here portion 132 has a groove 212 formed or machined thereinto, to thereby provide a channel 212 for the placement of a filler. A radiused interior portion 212 provides a transition between surface 134 and surface 138. As can be seen groove or channel 212 is a canted concave, being canted to one side. A filler material 214 is deposited into groove 212 to create an undulating irregular surface 216, in contrast to the shape of bar 16. Filler material 214 may be in the form of a weld that is ran along groove 212, substantially or completely filling groove 212.

Advantageously bar 116 provides an even better threshing experience than bar 16, with radius 210 and surface 216 enhancing the performance of bar 116. Undulating surface 216 provides a hardened robust resilient surface for the moving crop material to encounter and cause the grain to dislodge from the rest of the crop material. Surface 216 extends from surface 138 and can then form an outer curved surface that curves from surface 138 to an outer surface of bar 116. It is contemplated that surface 216 may be shaped along at least a portion to conform to extend from surface 138.

Figure 14:
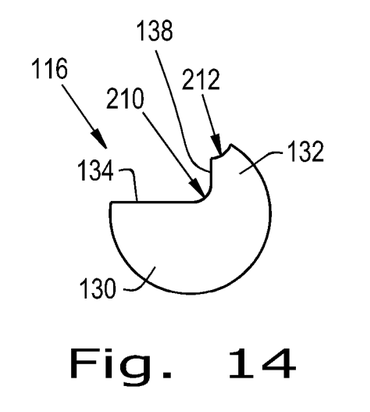
FIG. 14 illustrates an end view of the threshing bar of FIG. 13.
Figure 15:
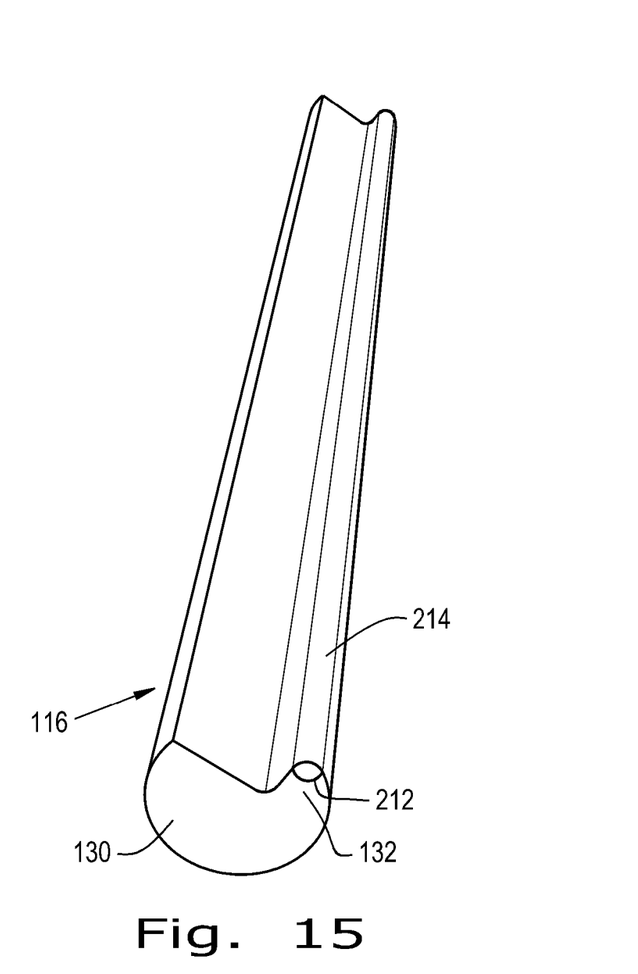
FIG. 15 shows a perspective view of the threshing bar of FIGS. 13 and 14.
Figure 16:
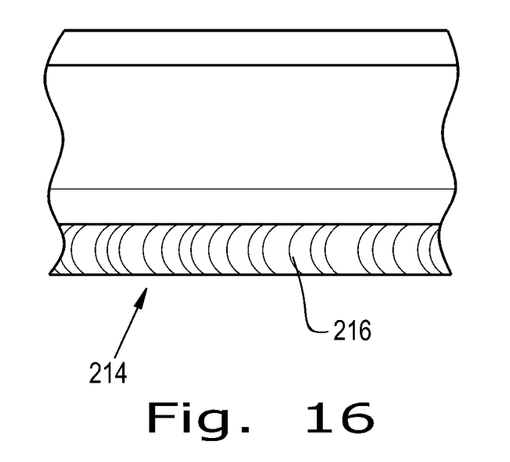
FIG. 16 shows a close-up view of the longitudinal makeup of the threshing bar of FIGS. 13-15.

The profile of bar 116 can be seen in FIGS. 14-16 to have a surface 134 that transitions to surface 138 by way of inside curve 210, then material 214, which sits in and fills groove 212 to form surface 216 transitions to the outer surface of bar 116. Filler material 214 is harder than the hardness of bar 116, and forms the irregular undulating surface 216.

Figure 17:
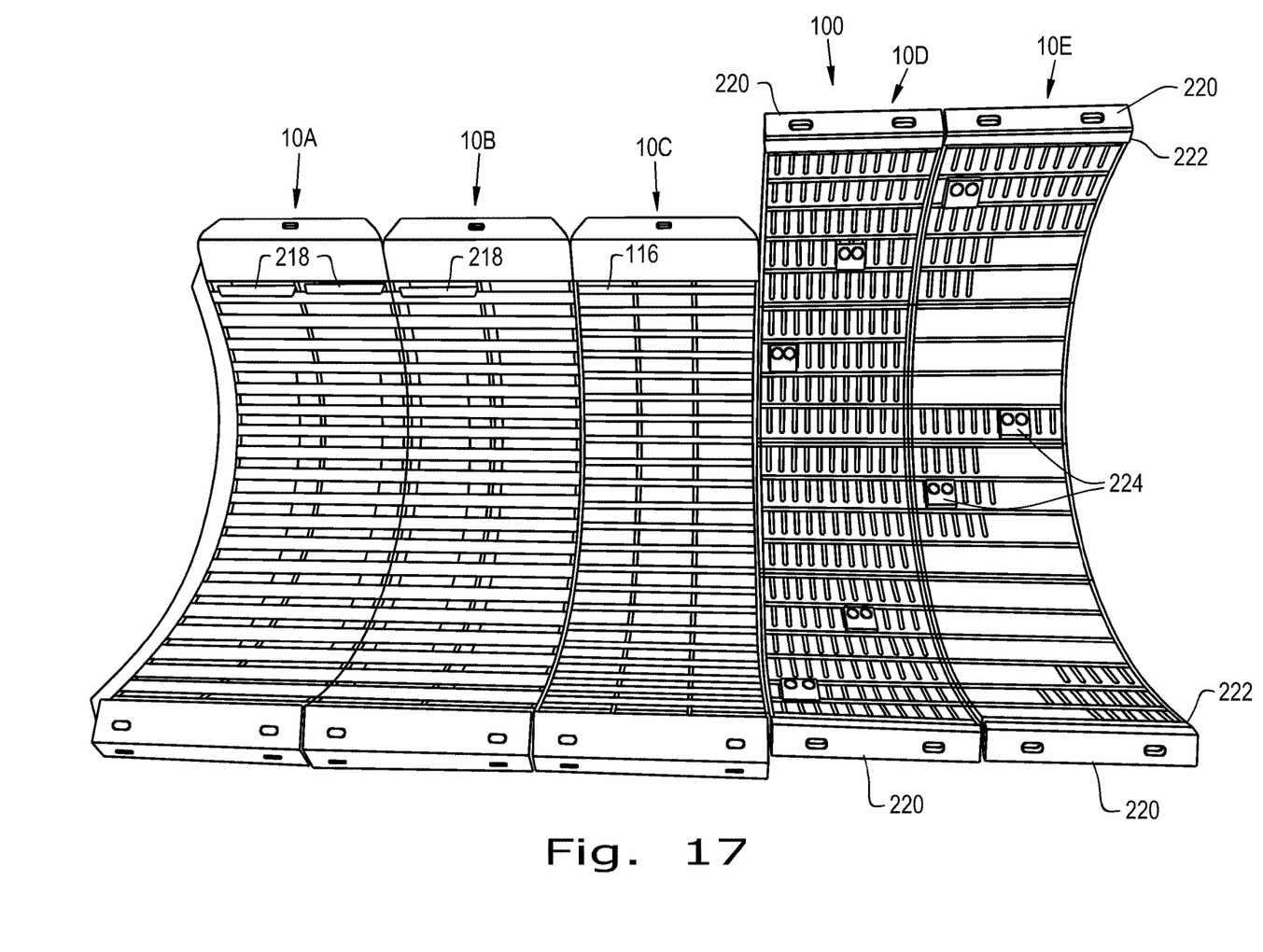
FIG. 17 illustrates a series of concaves using threshing bars of the present invention illustrated in the previous figures, with spacer bars, disrupters, and cover plates attached thereto.

As illustrated in FIG. 17 there are shown two cover plates 218 coupled to a convex side of a concave 10A and one cover plate 218 coupled to a convex side of concave 10B. Spacer bars 220 are coupled to ends 222 of concaves 10D and 10E. Spacer bars 220 are flat pieces that have a hole pattern similar to the ends of concaves 10D and 10E and serve to space concaves 10D and 10E outward from an axial axis of the rotor. Further, disrupters 224 are shown coupled to concaves 10D and 10E and disrupters 224 extend from the concave side of concaves 10D and 10E. Spacer bars 220 are coupled to each end of the frame of concaves 10D and 10E thereby spacing the concave side of the concave 10D and 10E radially outward from the rotor to provide additional space for disrupters 224. Cover plates 218 are adjustable in an axial direction to alter the amount of coverage of the associated concave 10A and 10B.

Figure 18:
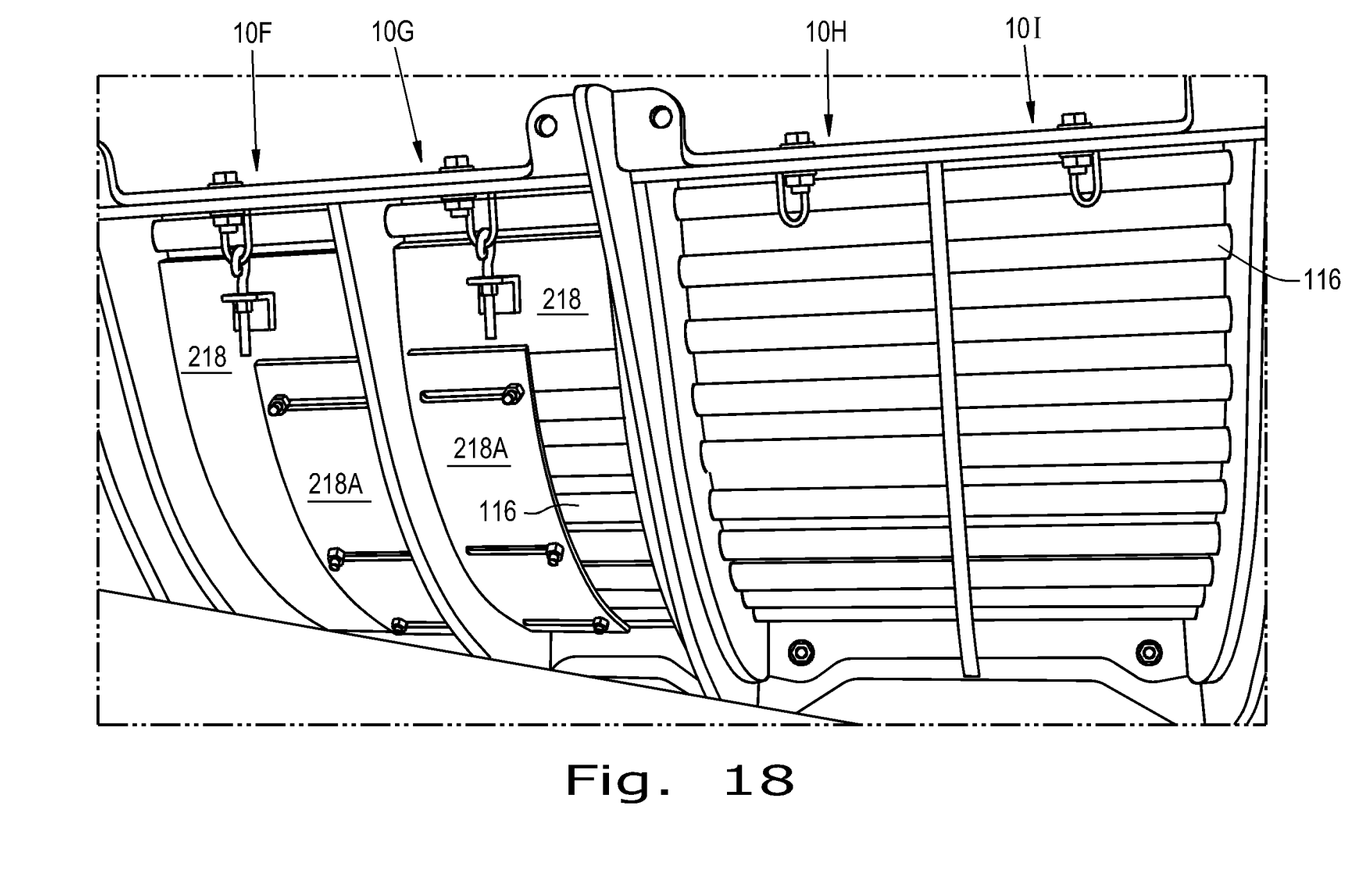
FIG. 18 illustrates the adjustment of a similar embodiment of cover plates on a series of concave sections similar to that of FIG. 17.

In FIG. 18 there is shown a variation of cover plates 218 with an adjustable side 218A, that are coupled to concave 10F/10G (which is a single concave having two cover plates 218 attached thereto), with concave 10H/10I not having any cover plates thereon. Adjustable side 218A is shown completely closed on concave section 10F, while adjustable side 218A of cover plate 218 attached to concave section 10G is shown adjusted completely open exposing one half of bars 116 so that grain can pass therethrough.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing concave for an agricultural combine, comprising:
    a frame comprised of a plurality of members interconnected to one another and including a pair of the members spaced apart opposite, and extending generally parallel, to one another, each of the opposite members having an upper portion with a top edge thereon and a plurality of openings formed in the upper portion adjacent to and below the top edge, the openings being spaced apart from one another such that the spaced apart openings formed in one of the opposite members respectively correspond with the spaced apart openings formed in the other of the opposite members; and
    an array of threshing elements supported by and extending between the opposite members of the frame and being spaced apart and extending generally parallel to one another; the threshing elements being elongated bars, each of the elongated bars having a pair of opposite ends each being respectively seated in a respective one of the corresponding openings of the opposite members of the frame, and a notch formed in the bar and extending longitudinally along the bar, the notch defining an aggressive threshing edge recessed into the bar and disposed adjacent to the upper portions of the opposite members of the frame and facing opposite to a direction of movement of a rotor of the agricultural combine, the notch having a channel along an outer edge of the notch, the channel being filled with filler material having a differing hardness than a hardness of the bar.

2. The threshing concave of claim 1, wherein the hardness of the filler material is harder than the hardness of the bar.

3. The threshing concave of claim 1, wherein the filler material has a surface that generally extends from a surface of the bar.

4. The threshing concave of claim 1, wherein the filler material has a surface that is an undulating surface.

5. The threshing concave of claim 4, wherein the undulating surface is irregular.

6. The threshing concave of claim 1, further comprising at least one adjustable cover plate coupled to the concave on a convex side of the concave.

7. The threshing concave of claim 1, further comprising at least one spacer bar coupled to an end of the frame.

8. The threshing concave of claim 1, further comprising at least one disrupter coupled to the concave and extending from a concave side of the concave.

9. The threshing concave of claim 8, further comprising a pair of spacer bars, one of the spacer bars coupled to an end of the frame and one of the spacer bars coupled to an opposite end of the frame thereby spacing the concave side of the concave radially outward from the rotor.

10. A threshing section of an agricultural combine, comprising:
    a rotor; and
    a plurality of concave sections spaced radially outward from the rotor, at least one of the plurality of concave sections including:
        a frame comprised of a plurality of members interconnected to one another and including a pair of the members spaced apart opposite, and extending generally parallel, to one another, each of the opposite members having an upper portion with a top edge thereon and a plurality of openings formed in the upper portion adjacent to and below the top edge, the openings being spaced apart from one another such that the spaced apart openings formed in one of the opposite members respectively correspond with the spaced apart openings formed in the other of the opposite members; and
        an array of threshing elements supported by and extending between the opposite members of the frame and being spaced apart and extending generally parallel to one another; the threshing elements being elongated bars, each of the elongated bars having a pair of opposite ends each being respectively seated in a respective one of the corresponding openings of the opposite members of the frame, and a notch formed in the bar and extending longitudinally along the bar, the notch defining an aggressive threshing edge recessed into the bar and disposed adjacent to the upper portions of the opposite members of the frame and facing opposite to a direction of movement of a rotor of the agricultural combine, the notch having a channel along an outer edge of the notch, the channel being filled with filler material having a differing hardness than a hardness of the bar.

11. The threshing section of claim 10, wherein the hardness of the filler material is harder than the hardness of the bar.

12. The threshing section of claim 10, wherein the filler material has a surface that generally extends from a surface of the bar.

13. The threshing section of claim 10, wherein the filler material has a surface that is an undulating surface.

14. The threshing section of claim 13, wherein the undulating surface is irregular.

15. An agricultural combine, comprising:
    a chassis; and
    a threshing section carried by the chassis, the threshing section including:
        a rotor; and
        a plurality of concave sections spaced radially outward from the rotor, at least one of the plurality of concave sections having:
            a frame comprised of a plurality of members interconnected to one another and including a pair of the members spaced apart opposite, and extending generally parallel, to one another, each of the opposite members having an upper portion with a top edge thereon and a plurality of openings formed in the upper portion adjacent to and below the top edge, the openings being spaced apart from one another such that the spaced apart openings formed in one of the opposite members respectively correspond with the spaced apart openings formed in the other of the opposite members; and an array of threshing elements supported by and extending between the opposite members of the frame and being spaced apart and extending generally parallel to one another; the threshing elements being elongated bars, each of the elongated bars having a pair of opposite ends each being respectively seated in a respective one of the corresponding openings of the opposite members of the frame, and a notch formed in the bar and extending longitudinally along the bar, the notch defining an aggressive threshing edge recessed into the bar and disposed adjacent to the upper portions of the opposite members of the frame and facing opposite to a direction of movement of a rotor of the agricultural combine, the notch having a channel along an outer edge of the notch, the channel being filled with filler material having a differing hardness than a hardness of the bar.

16. The agricultural combine of claim 15, wherein the hardness of the filler material is harder than the hardness of the bar.

17. The agricultural combine of claim 15, wherein the filler material has a surface that generally extends from a surface of the bar.

18. The agricultural combine of claim 15, wherein the filler material has a surface that is an undulating irregular surface.

19. The agricultural combine of claim 15, further comprising at least one adjustable cover plate coupled to at least one of the concaves on a convex side of the concave.

20. The agricultural combine of claim 15, further comprising:
- at least one disrupter coupled to the concave and extending from a concave side of the concave; and
- a pair of spacer bars, one of the spacer bars coupled to an end of the frame and one of the spacer bars coupled to an opposite end of the frame thereby spacing the concave side of the concave radially outward from the rotor.

* * * * *